No. 790,724. PATENTED MAY 23, 1905.
M. J. DAVIN.
AUTOMOBILE.
APPLICATION FILED OCT. 31, 1904.
2 SHEETS—SHEET 1.
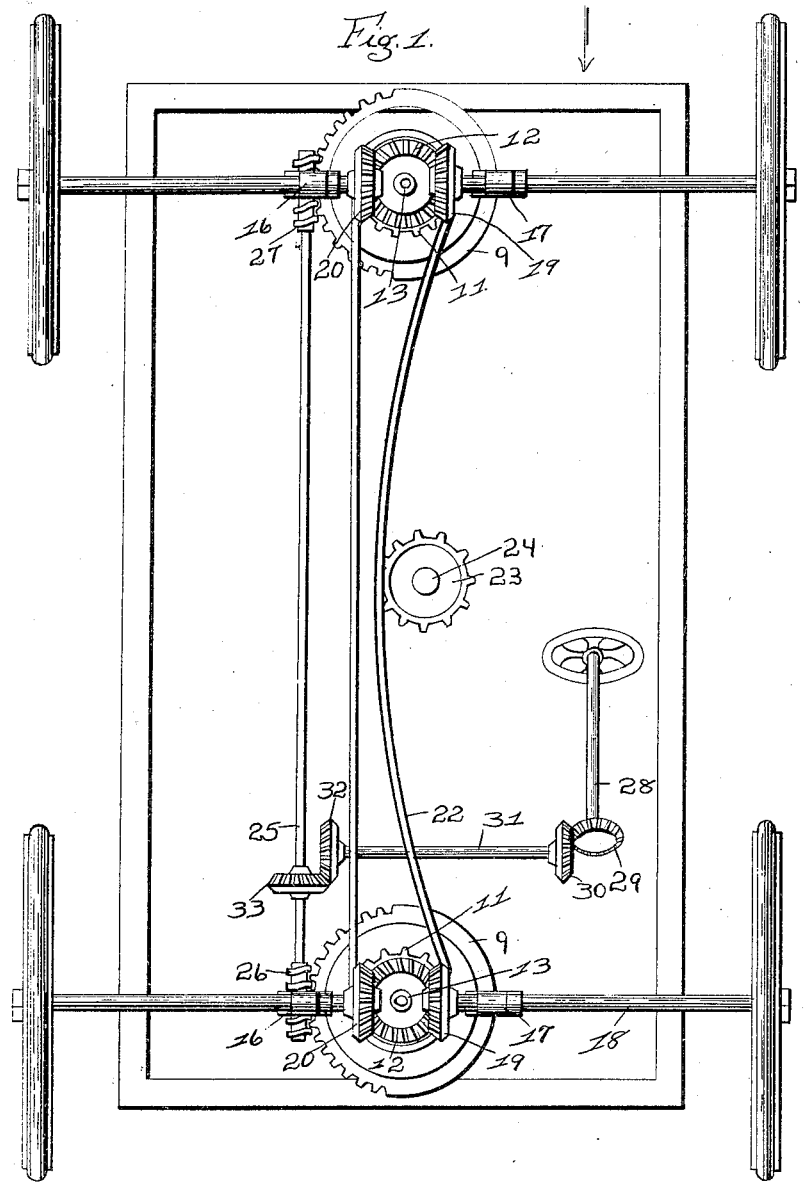
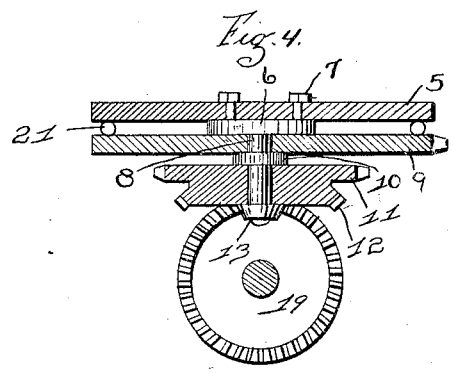
WITNESSES:
INVENTOR
Michael J. Davin No. 790,724. PATENTED MAY 23, 1905.
M. J. DAVIN.
AUTOMOBILE.
APPLICATION FILED OCT. 31, 1904.

2 SHEETS—SHEET 2.

WITNESSES:
Edw M Harrington
Alfred A Ericks

INVENTOR:
Michael J. Davin
By Higdon, Longan & Hopkins
attys

No. 790,724.

Patented May 23, 1905.

UNITED STATES PATENT OFFICE.

MICHAEL J. DAVIN, OF ST. LOUIS, MISSOURI.

AUTOMOBILE.

SPECIFICATION forming part of Letters Patent No. 790,724, dated May 23, 1905.

Application filed October 31, 1904. Serial No. 230,652.

*To all whom it may concern:*

Be it known that I, MICHAEL J. DAVIN, a citizen of the United States, and a resident of St. Louis, Missouri, have invented certain new and useful Improvements in Automobiles, of which the following is a specification containing a full, clear, and exact description, reference being had to the accompanying drawings, forming a part hereof.

My invention relates to improvements in automobiles; and it consists of the novel features herein shown, described, and claimed.

Figure 2:
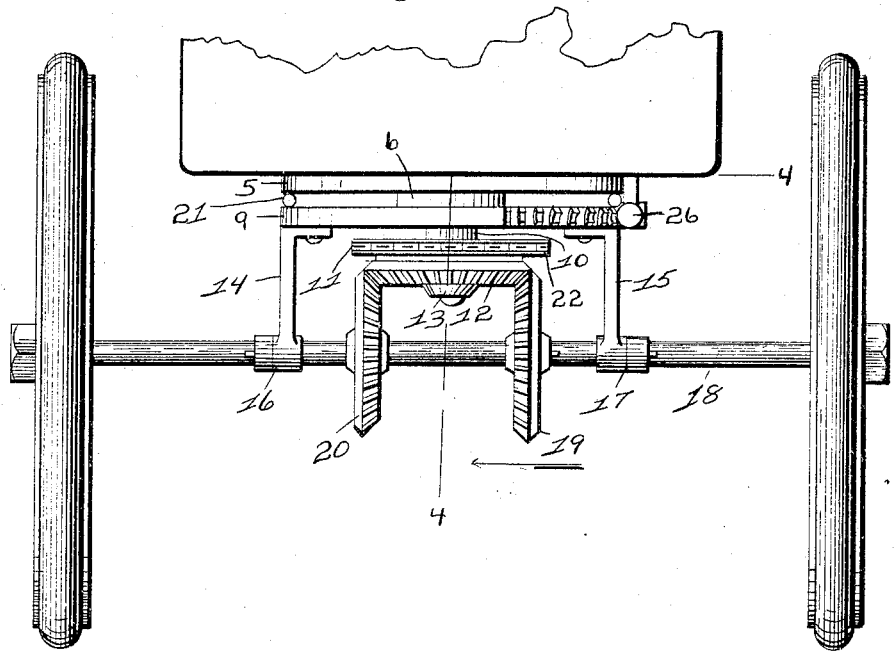
Figure 3:
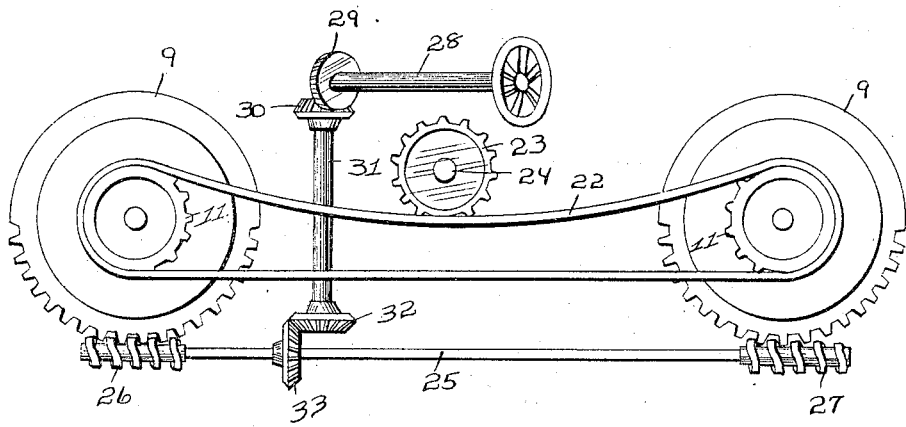

In the drawings, Figure 1 is a bottom plan view of an automobile running-gear and steering-gear embodying the principles of my invention as seen looking in the direction indicated by the arrow 1 in Fig. 2. Fig. 2 is an end elevation right side up of the parts shown in Fig. 1 as seen looking in the direction indicated by the arrow 2. Fig. 3 is a diagrammatic view of the running-gear and steering-gear, the other parts being omitted. Fig. 4 is a sectional detail, upon an enlarged scale, upon the line 4 4 of Fig. 2.

Referring to the drawings in detail, at the front end of the automobile the bearing-plate 5 is attached to the bottom of the body of the automobile. The king-bolt head 6 is secured to the plate 5 by cap-screws 7, and a king-bolt 8 extends downwardly from the head. The worm-gear segment 9 is loosely mounted upon the king-bolt. A spacing-block 10 is mounted upon the king-bolt below the segment. The sprocket-wheel 11 and the beveled gear 12 are formed integral or secured together and loosely mounted upon the lower end of the king-bolt and held in position by a nut 13. Brackets 14 and 15 extend downwardly from opposite sides of the segment 9, there being bearings 16 and 17 in the lower ends of the brackets. The front axle 18 is mounted in the bearings 16 and 17, and a beveled gear 19 is fixed upon the axle in mesh with the beveled gear 12. A second beveled gear 20 is loosely mounted upon the axle in mesh with the beveled gear 12 to improve the appearance and balance the weight. Bearing-balls 21 are mounted in suitable raceways between the segment 9 and the plate 5. The rear axle is mounted and driven in exactly the same way. A sprocket-chain 22 connects the sprocket-wheel 11 at the front end of the automobile to the sprocket-wheel 11 at the rear end and said chain 22 is driven by a sprocket 23 upon the driving-shaft 24, said driving-shaft being driven from the engine, so that as the engine operates both the front and rear axles are driven simultaneously. The worm-gear shaft 25 is mounted longitudinally of the automobile, there being a worm 26 upon the forward end of the shaft in mesh with the forward segment 9 and there being a worm 27 upon the rear end of the shaft in mesh with the rear segment 9. The steering-post 28 is mounted in a convenient position, there being a beveled gear 29 upon the lower end of the steering-post in mesh with the beveled gear 30 upon the counter-shaft 31, and a beveled gear 32 upon the other end of the counter-shaft meshes with the beveled gear 33, fixed upon the worm-shaft 25. The direction of the worm 26 is reversed relative to the worm 27, so that when the forward wheels are turned one way the rear wheels are turned in the other direction, so as to drive the automobile in a circle.

Thus it will be seen that I have provided means for not only driving the front and rear axles simultaneously, but of steering the front and rear wheels simultaneously. It is also obvious that the steering device might be omitted with reference to the rear axle without departing from the spirit of my invention.

I claim—

1. In an automobile: the bearing-plate 5; the king-bolt head 6 secured to the plate 5; the king-bolt 8 extending downwardly from the head 6; the worm-gear segments 9 loosely mounted upon the king-bolt; the spacing-block 10 mounted upon the king-bolt below the segment; the sprocket-wheel 11 loosely mounted upon the king-bolt; the beveled gear 12 loosely mounted upon the king-bolt and secured to the sprocket-wheel; an axle and a beveled gear upon the axle meshing with the beveled gear upon the king-bolt.

2. In an automobile: the front and rear bearing-plates 5 rigidly mounted; the front and rear king-bolt heads 6 secured to the bearing-plates 5; the front and rear king-bolts 8 extending downwardly from the heads; the front and rear worm-gear segments 9 loosely mounted upon the king-bolts; the spacing-blocks 10 mounted upon the king-bolts below the segments; the sprocket-wheels 11 loosely mounted upon the king-bolts below the spacing-blocks; the beveled gears 12 loosely mounted upon the king-bolts and secured to the sprocket-wheels; the front and rear axles beveled gears upon the axles in mesh with the beveled gears upon the king-bolts; a chain connecting the front and rear sprocket-wheels; means of driving the chain; a worm-gear shaft mounted longitudinally of the automobile; worm-gears upon the ends of the worm-shaft meshing with the front and rear worm-gear segments; a steering-post; and a connection between the steering-post and the worm-gear shaft; substantially as specified.

In testimony whereof I have signed my name to this specification in presence of two subscribing witnesses.

MICHAEL J. DAVIN.

Witnesses:
ALFRED A. EICKS,
M. M. BRAZILL.